US006284166B1

(12) United States Patent
Segen, Jr.

(10) Patent No.: US 6,284,166 B1
(45) Date of Patent: Sep. 4, 2001

(54) THERMOFORMING PRESSURE BOX ADJUSTABLE IN TWO DIMENSIONS AND METHOD OF USE

(75) Inventor: Edward D. Segen, Jr., Wilton, CT (US)

(73) Assignee: Edward D. Segen Company, Shelton, CT (US)

( * ) Notice: Subject to any disclaimer, the term of this patent is extended or adjusted under 35 U.S.C. 154(b) by 0 days.

(21) Appl. No.: 09/203,132

(22) Filed: Dec. 1, 1998

(51) Int. Cl.[7] ................................................... B29C 51/20
(52) U.S. Cl. ........................... 264/39; 264/550; 264/551; 264/322; 425/186; 425/195; 425/388
(58) Field of Search ..................................... 264/544, 550, 264/551, 39, 549, 322; 425/387.1, 388, 185, 186, 195, 326.1, 398, 412

(56) References Cited

U.S. PATENT DOCUMENTS 3,291,874 * 12/1966 Negero ................................. 264/537
3,527,854 * 9/1970 Martin et al. ........................ 264/551

* cited by examiner

Primary Examiner—Mathieu D. Vargot
(74) Attorney, Agent, or Firm—John H. Crozier

(57) ABSTRACT

In a preferred embodiment, a thermoforming pressure box, including: a horizontal top plate; first and second vertical end plates extending orthogonally downwardly from a lower surface of the top plate; first and second vertical side plates extending orthogonally downwardly from the lower surface of the top plate; the first and second end plates and the first and second side plates mating such that the top plate, the first and second end plates, and the first and second side plates form a downwardly open rectangular parallelopipidon having first length and width dimensions; the second vertical end plate being repositionable on the lower surface of the top plate in a direction parallel to an index direction; and at least one of the first and second side plates being repositionable on the lower surface of top plate in a direction orthogonal to the index direction.

5 Claims, 4 Drawing Sheets

THERMOFORMING PRESSURE BOX ADJUSTABLE IN TWO DIMENSIONS AND METHOD OF USE

BACKGROUND OF THE INVENTION

1. Field of the Invention

The present invention relates to thermoforming generally and, more particularly, but not by way of limitation, to novel pressure box and method for thermoforming, which box is adjustable in two dimensions.

2. Background Art

Thermoforming is widely used for producing three dimensional objects from relatively thin sheets of thermoplastic materials, such objects often being used a containers or parts of containers for goods, and are typified by blister pack covers, pastry domes, and fast-food sandwich containers, to name only a few examples.

In a typical thermoforming process, a rectangular mold base is provided which may have one or more cavities defined therein or may have provision made for affixing thereto one or more mold cavities. A web of thermoplastic material is fed from a roll of such material, heated and then indexed over the mold cavities. A plurality of holes defined through the walls of the cavities is connected to a vacuum source to draw the thermoplastic material into the cavities. To assist this drawing operation, pressure is applied to the upper surface of the thermoplastic material. Such pressure is supplied from a rectangular pressure box which is temporarily placed over the mold base and removably sealed thereto, the pressure box having an open base and a top with four walls depending therefrom. After forming, coolant may be supplied to the mold base and the molded objects are removed from the mold base typically by means of a stripper plate built into the mold base.

In high volume molding operations, the mold base and the pressure box are often dedicated equipment items of fixed dimensions. In custom thermoforming operations, however, it is common to use mold bases having different dimensions for different molding runs. In order to accommodate such mold bases, pressure boxes have been available which are adjustable in the index direction; that is, the direction in which the web of thermoplastic material moves. This is accomplished by having two parallel side walls and one end wall attached to the top wall of the pressure box, with the other of the end walls selectively positionable in the index direction and removably attached to the side walls and the top wall.

Such pressure boxes adjustable in the index direction have been available for the past 20 to 30 years. The availability of pressure boxes adjustable in the index direction permits accommodating a variety of mold bases having different dimensions in the index direction, thus reducing the inventory of pressure boxes which must be maintained by a custom thermoformer. However, heretofore, no pressure box has been adjustable in the direction orthogonal to the index direction and sometimes a custom thermoformer may have to inventory three or more pressure boxes of different widths. Having available such a pressure box adjustable in two dimensions would greatly decrease the number of pressure boxes required to be inventoried by a custom thermoformer and, perhaps, a custom thermoformer might require only one such pressure box, with the concomitant cost savings.

Accordingly, it is a principal object of the present invention to provide a thermoforming pressure box adjustable in both the index direction and the direction orthogonal to the index direction.

It is a further object of the invention to provide such a pressure box that is economically constructed and conveniently adjusted.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a thermoforming pressure box, comprising: a horizontal top plate; first and second vertical end plates extending orthogonally downwardly from a lower surface of said top plate; first and second vertical side plates extending orthogonally downwardly from said lower surface of said top plate; said first and second end plates and said first and second side plates mating such that said top plate, said first and second end plates, and said first and second side plates form a downwardly open rectangular parallelopipidon having first length and width dimensions; said second vertical end plate being repositionable on said lower surface of said top plate in a direction parallel to an index direction; and at least one of said first and second side plates being repositionable on said lower surface of top plate in a direction orthogonal to said index direction.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1A:
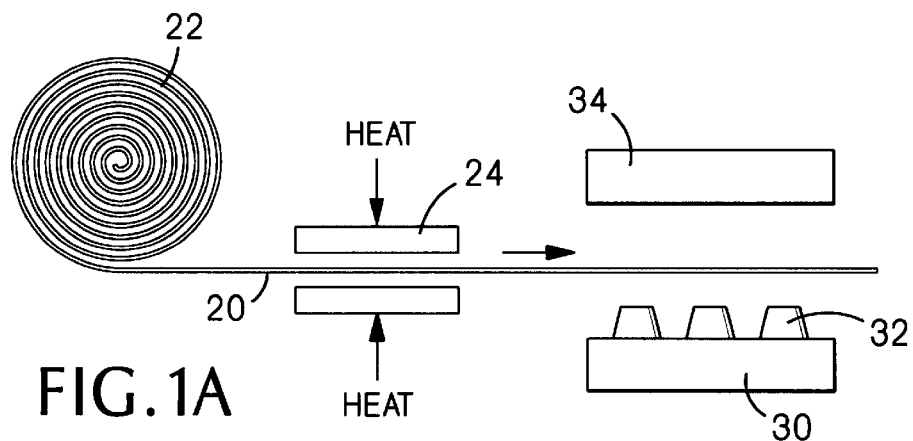
FIGS. 1A–1C are schematic views of a typical thermoforming operation.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 1B:
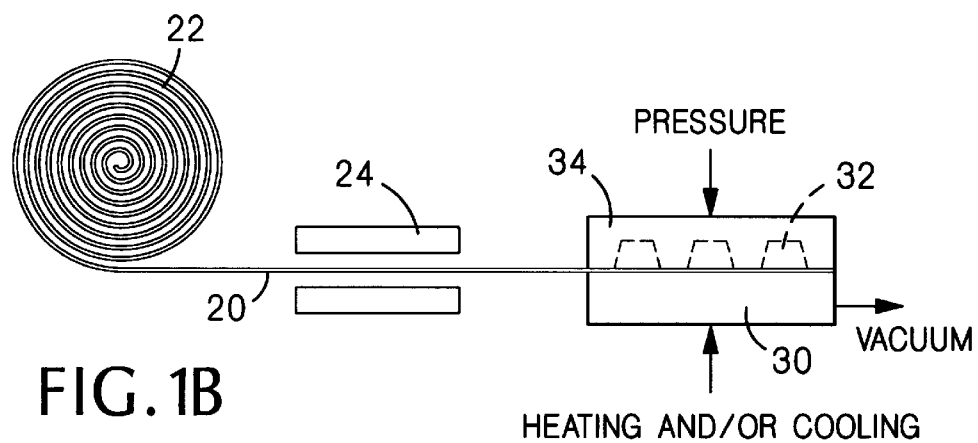
Figure 1C:
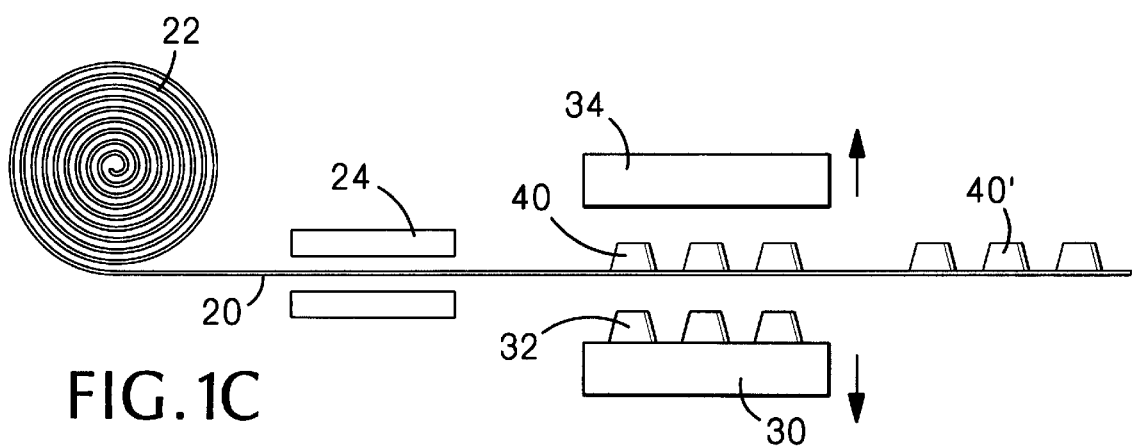

Referring first to FIGS. 1A–1C, there is illustrated a typical termoforming operation in which the pressure box of the present invention may be employed. As seen on FIG. 1A, a web 20 of unformed thermoplastic material is fed from a roll 22 of such material through a heater 24 where the web is softened. Web 20 is then indexed over a mold base 30 having rising therefrom plurality of male molds, as at 32. Web 20 is moved by means of pin chains (not shown) disposed at either side of the web and engaging the web. A pressure box 34, which may be a pressure box constructed according to the present invention, is positioned over mold base 30. Then, as seen on FIG. 1B, pressure box 34 is temporarily sealed to mold base 30, a source of vacuum is supplied to the mold base, air pressure is applied to the pressure box, and heating or cooling may be supplied to mold base 30 to maintain a predetermined temperature in the mold base. This operation draws web 20 around male molds 32. Then, as seen on FIG. 1C, pressure box 34 and mold base 30 are separated and web 20, with molded objects, as at 40, formed therein and conforming to the shape of molds 32 is moved to a station (not shown) where the molded objects are cut from the web. A set of previously molded objects, as at 40' are shown as having been moved from pressure box 34 and mold base 30.

Figure 2:
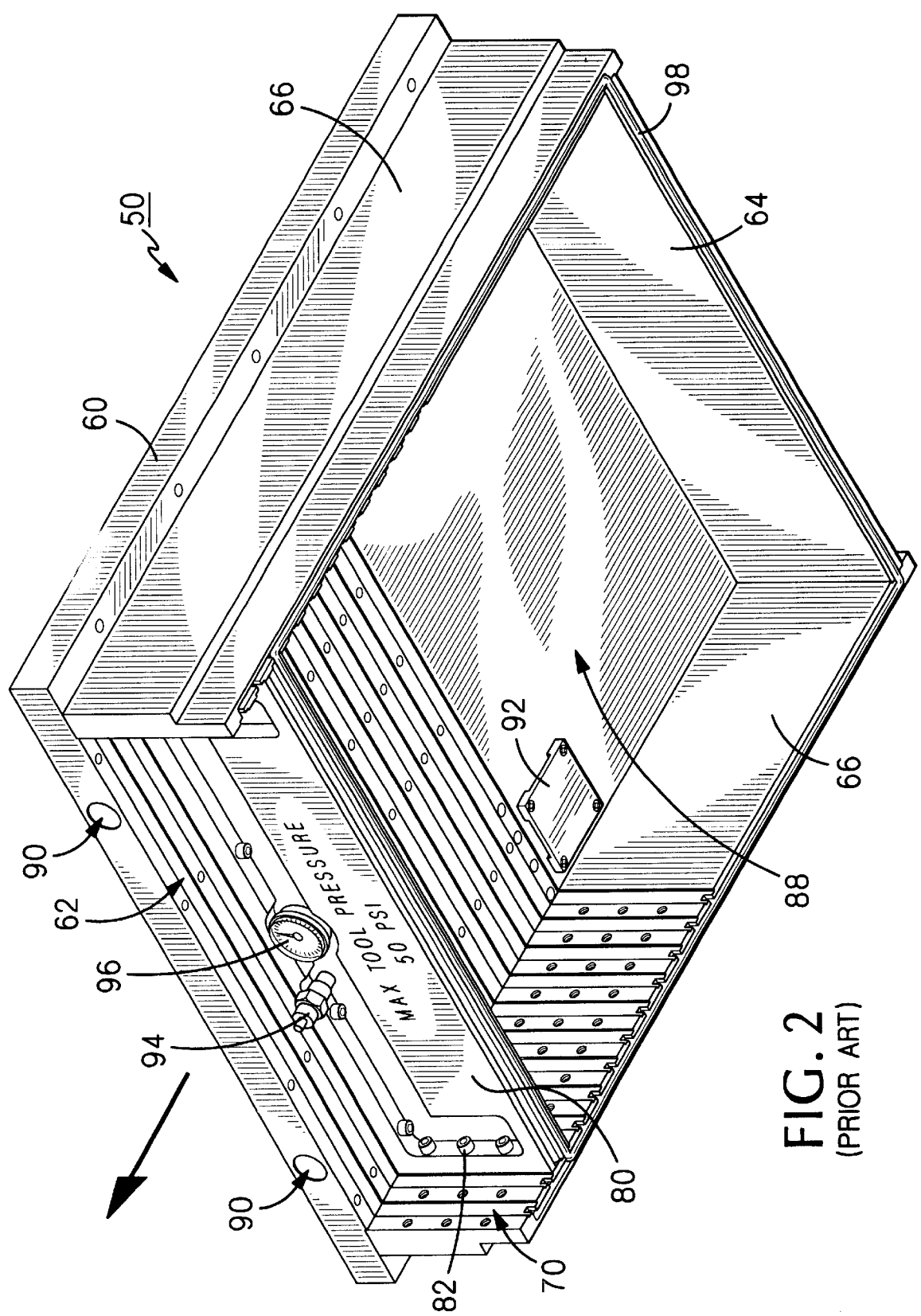
FIG. 2 is an isometric view of a conventional pressure box adjustable in the index direction.

FIG. 2 illustrates a conventional pressure box, generally indicated by the reference numeral 50. Pressure box 50 includes a horizontal top plate 60 having defined therein a plurality of parallel horizontal grooves, as at 62, orthogonal to the index direction indicated by the arrow on FIG. 2. A "fixed" vertical end plate 64 extending orthogonally from the lower surface of top plate 60, orthogonal to the index direction, is attached to the top plate by means of threaded fasteners (not shown). Two "fixed" vertical side plates 66 extending orthogonally from the lower surface of top plate 60, parallel to the index direction, are also attached to the top plate by means of threaded fasteners (not shown). Ends of the "fixed" end plate 64 and side plates 66 sealingly mate with each other.

Each of the inner surfaces of side plates 66 has defined therein a plurality of vertical grooves, as at 70, the upper ends of each opposing pair of such grooves meeting the ends of a horizontal groove 62 so as to form a U-shaped channel. Edges of a repositionable end plate 80 are inserted in a pair of vertical grooves 70 and a corresponding horizontal groove 62 and the repositionable end plate is attached to top plate 60 and side plates 66 by means of a plurality of threaded fasteners, as at 82. So arranged, top plate 60, side plates 66, and end plates 64 and 80 form a downwardly open rectangular parallelopipidon defining a volume 88.

Two channels 90 are provided in top plate 60 for connection thereto of a source of pressurized air which air is introduced into volume 88 above raised diffuser plates 92 (only one visible on FIG. 2). A pressure relief valve 94 and a pressure gauge 96 are disposed in repositionable end plate 80 and a resilient sealing member 98 is disposed around the lower edges of side plates 66 and end plates 64 and 80 to form an air tight seal between pressure box 50 and a mold base, such as mold base 30 (FIG. 1) on which it may be placed.

It will be understood that pressure box 50 can be adjusted to accommodate the length of the pressure box to mold bases having different dimensions in the index direction by unscrewing threaded fasteners 82 and those (not shown) securing repositionable end plate 80 to top plate 60, removing the repositionable end plate from one set of grooves 62 and 70, reinserting the repositionable end plate in another set of grooves 62 and 70, refastening the threaded fasteners, and replacing sealing member 98 with another sealing member of appropriate dimensions.

Figure 3:
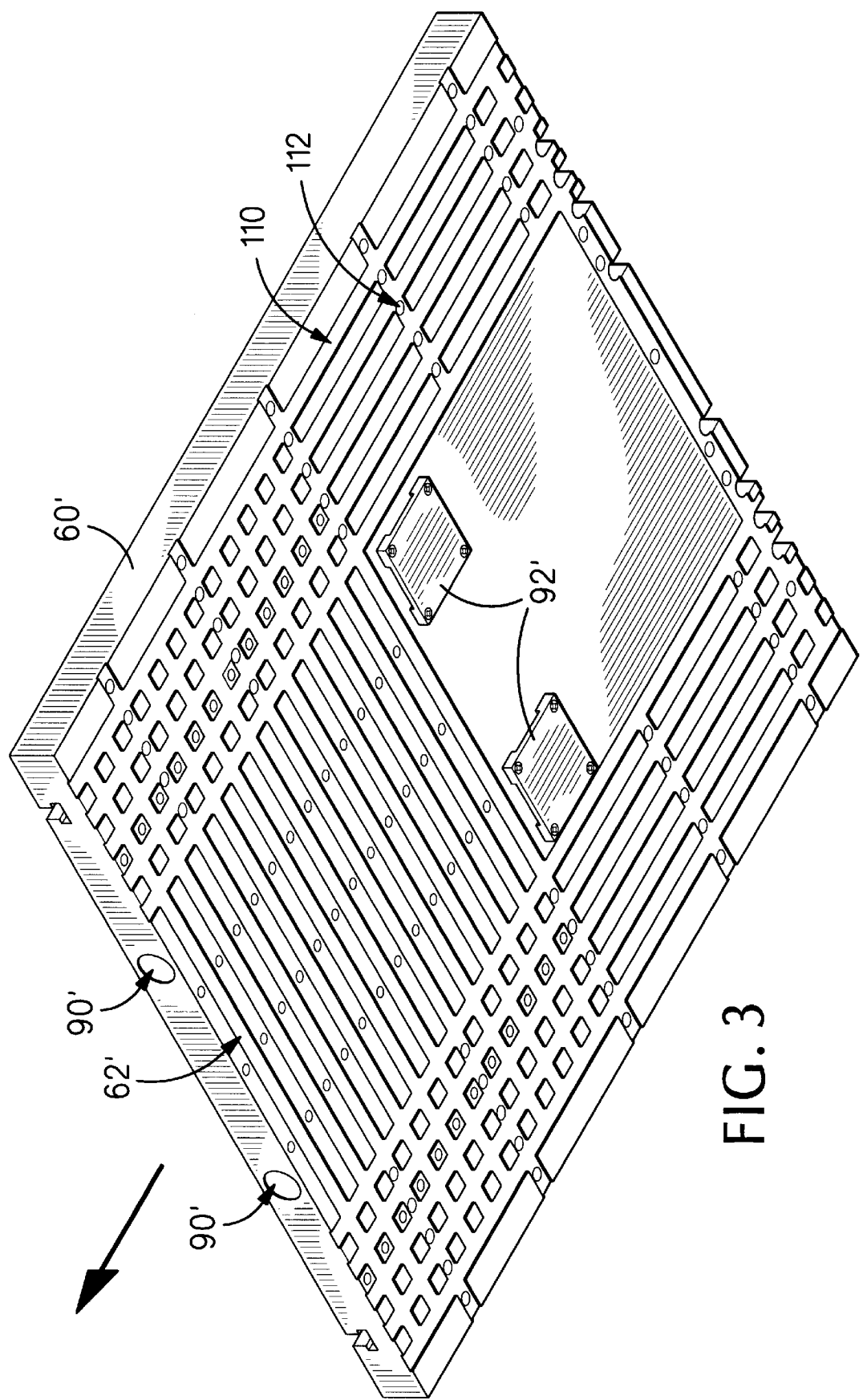
FIG. 3 is a bottom plan view of a top plate for a pressure box constructed according to the present invention.

FIG. 3 illustrates a top plate, generally indicated by the reference numeral 60', and constructed according to the present invention. Elements of top plate 60' having structure and function similar to those of top plate 60 (FIG. 2) are given primed reference numerals. Top plate 60' is similar to top plate 60 (FIG. 2), except that top plate 60 has a plurality of grooves, as at 110, defined in the lower surface of the top plate, parallel to the index direction, and intersecting grooves 62'. Top plate 60' has defined therein a plurality of tapped holes, as at 112.

Figure 4:
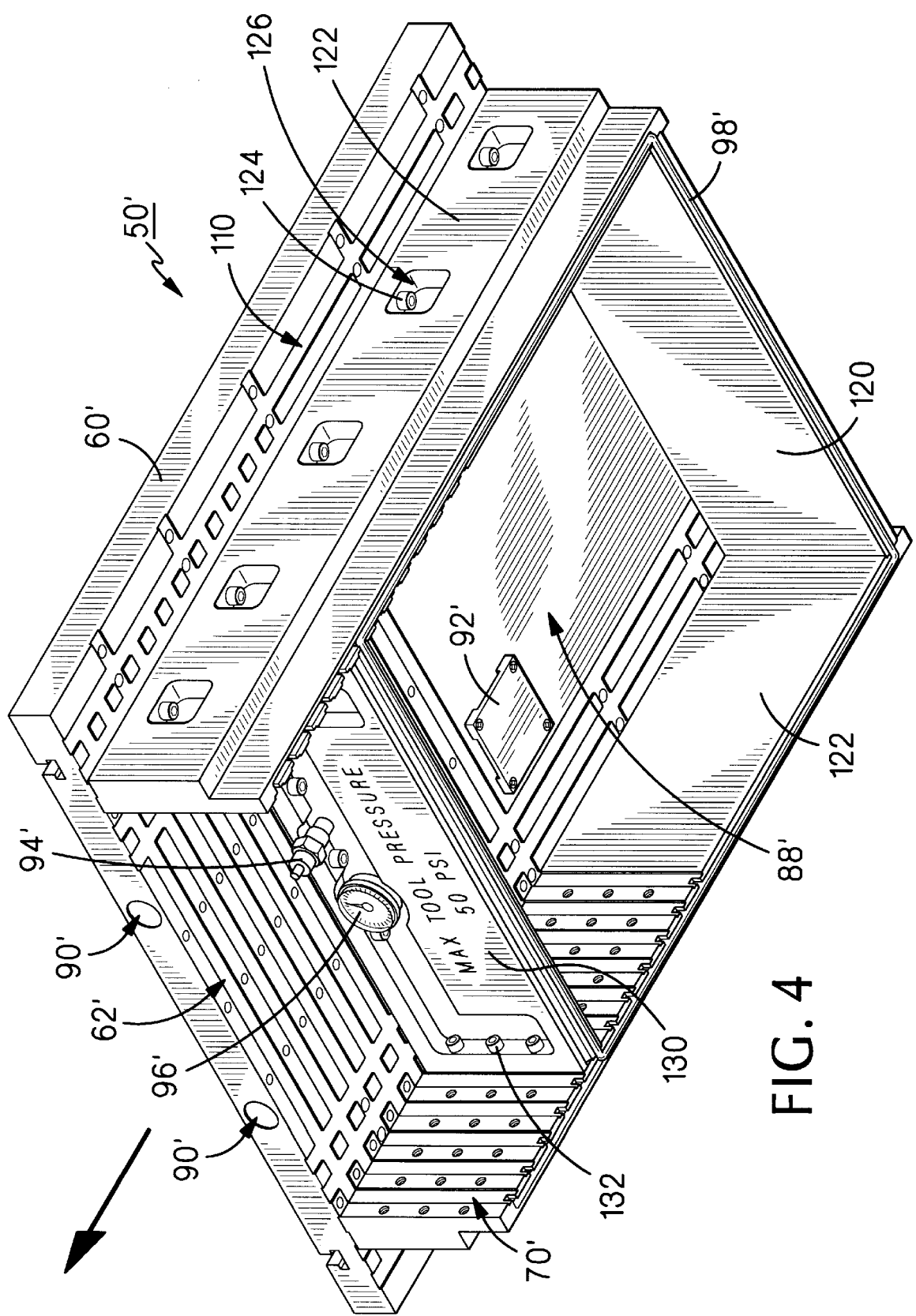
FIG. 4 is an isometric view of a pressure box constructed according to the present invention.

FIG. 4 illustrates a pressure box, generally indicated by the reference numeral 50', employing top plate 60' (FIG. 3), and constructed according to the present invention. Elements of pressure box 50' having structure and function similar to those of pressure box 50 (FIG. 2) are given primed reference numerals. A first vertical end plate 120 extends orthogonally downwardly from the lower surface of top plate 60' and is removably attached thereto by means of threaded fasteners (not shown). Vertical side plates 122 extending orthogonally downwardly from the lower surface of top plate 60' parallel to the index direction, are inserted in a selected pair of grooves 110, and are removably attached to the top plate by means of a plurality of threaded fasteners, as at 124, disposed within a plurality of "windows", as at 112, defined in the outer wall of side plates 122. A second vertical end plate 130 extends orthogonally downwardly from the lower surface of top plate 60'. Edges of second end plate 130 are inserted in a pair of grooves 70' and a corresponding groove 62', and the second end plate is removably attached to side plates 122 and top plate 60' by means of a plurality of threaded fasteners, as at 132. So arranged, pressure box 50' forms a downwardly open rectangular parallelopipidon similar to that of pressure box 50 (FIG. 2).

Pressure box 50' is adjustable in the index direction in the same manner as described above with reference to pressure box 50 (FIG. 2). In this case, however, pressure box 50' is also adjustable in the direction orthogonal to the index direction by means of unscrewing threaded fasteners 124 and 132 from one side plate 122, removing the side plate from a groove 110, repositioning the side plate to another groove 110, and reattaching threaded fasteners 124 and 132. Similarly, the other of side plates 122 can be repositioned if necessary. With replacement of first and second end plates 120 and 132 and sealing member 98' with similar members of appropriate lengths, pressure box 50' is now reconfigured with new dimensions parallel with and orthogonal to the index direction. Of course, pressure box 50' can be reconfigured by changing only one of those dimensions.

Through use of the present invention, a thermoformer now is required to inventory only one top plate, a pair of side walls, and whatever selection of lengths of first and second end plates 120 and 132 and sealing member 98' is required to provide a desired range of pressure box sizes.

Referring again to FIG. 4, an important feature of the invention resides in having threaded fasteners 124 disposed within windows 126. When a pressure box is used below a mold base, that is, with the positions of pressure box 34 and mold base 30 shown on FIGS. 1A–1C reversed, it is important that the width of the mold box be minimized. This is because the side plates of the mold box fit within the pin chains moving web 20 and any web material disposed between the inside surfaces of the side plates and the pin chains is wasted web material. Therefore, it is desirable to minimize the widths of the side plates to minimize the amount of wasted material.

While the same method of attaching side plates 122 to top plate 88' could be employed as is used for attaching side plates 66 to top plate 60 (FIG. 2), that is, inserting threaded fasteners through the top of top plate 60', through holes 112, and into the edges of side plates 122, the large number of the holes means that unused such holes within volume 88' would have to be plugged to prevent the escape of air from the volume. That arrangement would increase cost and complexity and would present avenues for leakage. A direct solution would be to provide flanges extending outwardly from side plates 122; however, that arrangement would increase the effective thickness of the side plates and would result in increased wastage of web material. With the provision of threaded fasteners 124 within windows 126, there is no additional thickness added to side plates 122.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A thermoforming pressure box, comprising:
   (a) a horizontal top plate;
   (b) first and second vertical end plates extending orthogonally downwardly from a lower surface of said top plate;
   (c) first and second vertical side plates extending orthogonally downwardly from said lower surface of said top plate;
   (d) said first and second end plates and said first and second side plates mating such that said top plate, said first and second end plates, and said first and second side plates form a downwardly open rectangular parallelopipidon having first length and width dimensions;
   (e) said second vertical end plate being repositionable on said lower surface of said top plate in a direction parallel to an index direction;
   (f) at least one of said first and second side plates being repositionable on said lower surface of top plate in a direction orthogonal to said index direction; and
   (g) a plurality of fasteners attaching said side plates to said top plate, said fasteners extending from said side plates into top plate, and said fasteners being disposed within windows defined in said side plates.

2. A thermoforming pressure box, as defined in claim 1, wherein: when said at least one of said first and second side plates is repositioned on said top plate, said first and second end plates are replaced with third and fourth end plates mating with said first and second end plates so as to form a downwardly open rectangular parallelopipidon having second length and width dimensions.

3. A thermoforming pressure box, as defined in claim 1, wherein: upper edges of said first and second side plates are disposed in a pair of selected grooves defined in said lower surface of said top plate, said grooves being parallel to said index direction.

4. A method of adjusting length and width dimensions of a thermoforming pressure box, said thermoforming pressure box having a horizontal top plate, first and second vertical end plates extending orthogonally downwardly from a lower surface of said top plate, first and second vertical side plates extending orthogonally downwardly from said lower surface of said top plate, said first and second end plates and said first and second side plates mating such that said top plate, said first and second end plates, and said first and second side plates form a downwardly open rectangular parallelopipidon having first length and width dimensions, said method comprising;
   (a) repositioning said second vertical end plate on said lower surface of said top plate in a direction parallel to an index direction;
   (b) repositioning at least one of said first and second side plates on said lower surface of top plate in a direction orthogonal to said index direction; and
   (c) replacing said first and second end plates with third and fourth end plates mating with said first and second side plates so as to form a downwardly open rectangular parallelopipidon with second length and width dimensions whereby, said pressure box is provided with a plurality of fasteners attaching said side plates to said top plate, said fasteners extending from said side plates into said top plate, and said fasteners being disposed in windows defined in said side plates.

5. A method of adjusting length and width dimensions of a thermoforming pressure box, as defined in claim 4, further comprising: disposing upper edges of said first and second side plates in a pair of selected grooves defined in said lower surface of said top plate, said grooves being parallel to said index direction.

* * * * *